(12) United States Patent
Nausieda et al.

(10) Patent No.: US 8,434,607 B2
(45) Date of Patent: May 7, 2013

(54) COMPACT TORQUE TRANSMITTING ASSEMBLY

(75) Inventors: Anton W. Nausieda, White Lake, MI (US); Michael H. Welch, Davisburb, MI (US); Charles S. Davis, Livonia, MI (US); Tami A. Curtis, South Lyon, MI (US); Zhipeng Han, Canton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 581 days.

(21) Appl. No.: 12/711,043

(22) Filed: Feb. 23, 2010

(65) Prior Publication Data

US 2011/0203894 A1    Aug. 25, 2011

(51) Int. Cl.
    *F16D 25/0638*      (2006.01)
(52) U.S. Cl.
    USPC .......... 192/85.39; 192/85.44; 192/70.2; 192/221
(58) Field of Classification Search .......... 192/59, 192/70.11, 70.27, 70.28, 70.2, 85.2, 85.23, 192/85.24, 85.39, 85.44, 220, 221, 225
See application file for complete search history.

(56) References Cited

U.S. PATENT DOCUMENTS

| 4,391,354 | A * | 7/1983 | Bucksch ............... 188/71.5 |
| 6,648,117 | B2 * | 11/2003 | Shoji et al. ............. 192/55.61 |
| 6,929,107 | B2 * | 8/2005 | Hegerath ............... 192/85.44 |
| 6,945,371 | B2 * | 9/2005 | Schmidt ................ 192/70.12 |
| 7,631,739 | B2 * | 12/2009 | Enstrom ............... 192/85.39 |
| 7,758,377 | B2 * | 7/2010 | Maruyama ............... 439/582 |
| 2005/0087420 | A1 * | 4/2005 | Schafer et al. ........... 192/55.61 |
| 2007/0039796 | A1 | 2/2007 | Schroder et al. |
| 2009/0211865 | A1 * | 8/2009 | Braford et al. .......... 192/70.11 |

* cited by examiner

*Primary Examiner* — David D Le
*Assistant Examiner* — Jacob S Scott

(57) ABSTRACT

A torque transmitting device for transmitting torque between a first and second members includes an annular piston that defines an axis and an apply plate translatable along the axis between an unengaged position and an engaged position. The apply plate has a first end disposed radially inward of a second end and is in contact with the piston. An apply disc is rotationally coupled to the first member and is translatable between unengaged and engaged positions. The apply disc is disposed radially outward of the piston. A backing disc is rotationally and axially fixed to the first member and disposed radially outward of the piston. A friction plate is disposed between the apply disc and the backing disc. The friction plate has a first end disposed radially inward of a second end and is rotationally coupled to the second member. The friction plate is disposed radially outward of the piston.

22 Claims, 2 Drawing Sheets

COMPACT TORQUE TRANSMITTING ASSEMBLY

FIELD

Figure 1:
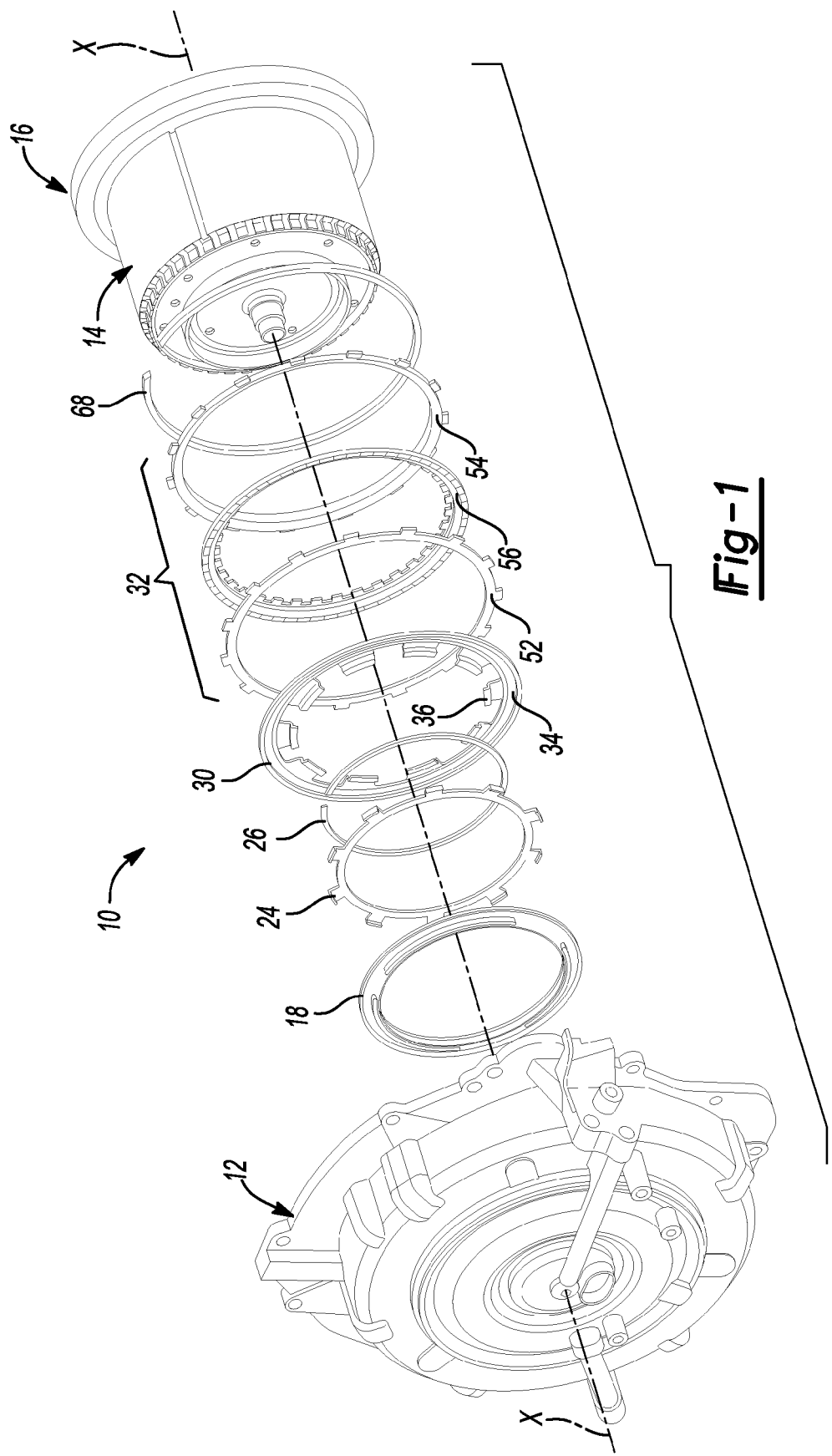

The invention relates generally to a compact torque transmitting assembly, and more particularly to a compact torque transmitting assembly having radially displaced plates in a transmission.

BACKGROUND

The statements in this section merely provide background information related to the present disclosure and may or may not constitute prior art.

A typical multi-speed automatic transmission uses a combination of torque transmitting devices, such as clutches or brakes, to achieve a plurality of forward and reverse gear or speed ratios as well as a Neutral and a Park. Selection of speed ratios is typically accomplished by a microprocessor transmission control module that employs various vehicle parameters, for example vehicle speed, and various driver input signals, for example accelerator pedal position, to select the appropriate speed ratios. The transmission then engages a combination of the toque transmitting devices to provide the desired speed ratios.

In order to engage the torque transmitting devices, a typical automatic transmission includes a hydraulic clutch control system that employs a hydraulic fluid to selectively actuate pistons within the torque transmitting devices. Actuation of a piston in turn engages the torque transmitting elements (i.e., friction discs and metal plates) within the torque transmitting device.

In all transmission types, axial length of the transmission (i.e. axial packaging) is an important design consideration. For example, hybrid transmissions have an electric motor located along the axis of the transmission that is coupled to a torque transmitting device. Accordingly, the length of the electric motor and the torque transmitting device within the transmission directly impacts the axial length of the powertrain. One solution to limiting the length of the powertrain is to limit the length of the electric motor. However, this may impact the motor torque output of the electric motor and impact vehicle performance. Accordingly, there is a need in the art for a compact torque transmitting device that operates effectively and smoothly that reduces the axial length of the transmission which in turn eliminates the need to reduce the axial length of other components within the transmission.

SUMMARY

A torque transmitting device for selectively transmitting torque between a first member and a second member is provided. The torque transmitting device includes an annular piston that defines an axis, an apply plate translatable along the axis between an unengaged position and an engaged position. The apply plate has a first end and a second end, wherein the first end is disposed radially inward of the second end, and wherein the first end is in contact with the piston. An apply disc is rotationally coupled to the first member and is translatable between an unengaged position and an engaged position along the axis. The apply disc is disposed radially outward of the piston. A backing disc is rotationally and axially fixed to the first member and disposed radially outward of the piston. A friction plate is disposed between the apply disc and the backing disc. The friction plate has a first end and a second end, wherein the first end is disposed radially inward of the second end, wherein the first end is rotationally coupled to the second member, and wherein the friction plate is disposed radially outward of the piston. The torque transmitting device is engaged when the piston is pressurized and translates the apply plate, the second end of the apply plate contacts the apply disc, and the friction plate is compressed between the apply disc and the backing disc, thereby rotationally coupling the apply disc and backing disc with the friction plate.

In one example of the torque transmitting device, the apply plate includes at least one tab, and the first end is located on the at least one tab.

In another example of the torque transmitting device, the apply plate includes an annular portion, and the second end is located on the annular portion and the at least one tab extends radially inwardly from an inner diameter of the annular portion.

In another example of the torque transmitting device, the first end of the apply plate is in radial alignment with the second end of the apply plate and the inner diameter of the annular portion is axially offset from the first and second ends.

In another example of the torque transmitting device, a portion of the apply plate is in radial alignment with at least one of the apply disc and the friction plate.

In another example of the torque transmitting device, the apply disc, the backing disc, and the friction plate are disposed entirely radially outward of the annular piston.

In another example of the torque transmitting device, the apply plate, apply disc, backing disc, and friction plate are coaxial with the annular piston.

In another example of the torque transmitting device, the friction plate includes a radial portion disposed between the apply disc and the backing disc and an axial portion disposed radially inward of the backing disc and in radial alignment with the backing disc, wherein the second end of the friction plate is disposed on the radial portion.

In another example of the torque transmitting device, the friction plate includes at least one spline disposed radially inward from an end of the axial portion, and the spline is engaged with the second member.

In another example of the torque transmitting device, the friction plate includes first and second friction surfaces on opposite sides of the radial portion of the friction plate.

In another example of the torque transmitting device, a return spring is in engagement with the first member and with the piston, and the return spring moves the piston and apply plate to the unengaged position when the piston is depressurized.

Further objects, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

Figure 2:
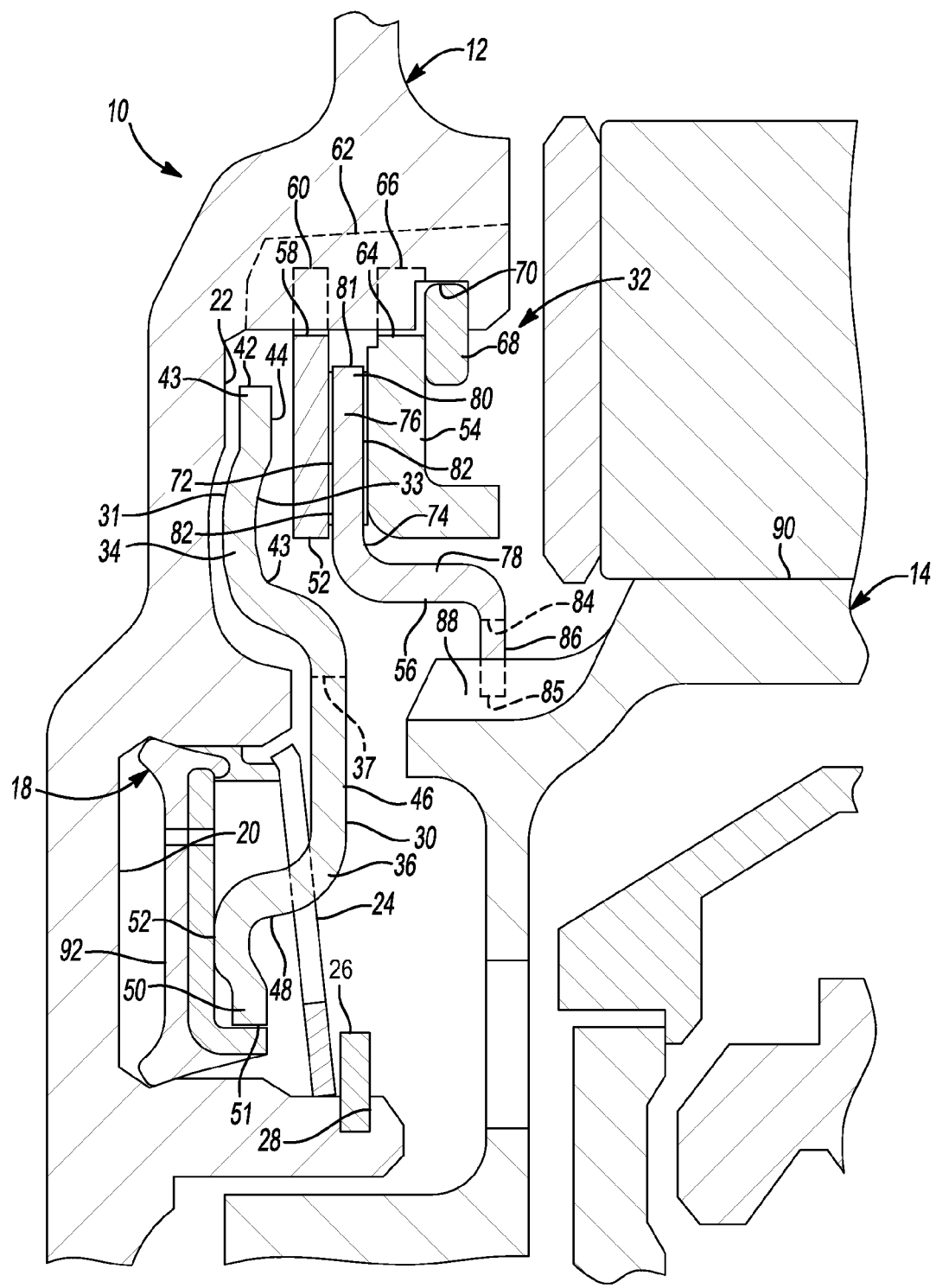

FIG. 1 is an exploded, isometric view of a torque transmitting device according to the principles of the present invention located within an exemplary transmission; and FIG. 2 is cross-sectional view of a portion of the torque transmitting device and the transmission according to the principles of the present invention.

DETAILED DESCRIPTION

The following description is merely exemplary in nature and is not intended to limit the present disclosure, application, or uses.

With reference to FIGS. 1 and 2, a torque transmitting device according to the principles of the present invention is generally indicated by reference number 10. The torque transmitting device 10 is employed in the present embodiment within a transmission of a motor vehicle. The torque transmitting device 10 is operable to transmit torque between a first component 12 and a second component 14. In the example provided, the first component 12 is a transmission case or housing and the second component is a rotatable motor rotor hub of an electric motor 16. Accordingly, in the example provided, the torque transmitting device 10 acts as a brake for the electric motor 16. However, it should be appreciated that the torque transmitting device 10 may be used as a clutch or brake between any members including rotating shafts, gears, and other transmission components in standard automatic transmissions or hybrid transmissions without departing from the scope of the present invention.

The transmission case 12 and the motor rotor hub 14 are coaxial with one another and define an axis "X". The transmission case 12 is a typically cast, metal housing which encloses and protects the various components of the transmission. The transmission case 12 includes a variety of apertures, passageways, shoulders and flanges which position and support these components. The electric motor 16 is operable to produce an output torque via rotation of the motor rotor hub 14. The motor rotor hub 14 rotates about the axis X.

The torque transmitting device 10 is disposed between the transmission case 12 and the motor rotor hub 14 and is coaxial with the axis X. The torque transmitting device 10 includes a piston 18 disposed within an annular pocket 20 formed in an inside surface 22 of the transmission case 12. The piston 18 is sealingly engaged with the inner surface 22 of the transmission case 12. The piston 18 is hydraulically actuatable to slide within the annular pocket 20 in a direction towards the motor rotor hub 14 to an engaged position. A return spring 24 is disposed adjacent the piston 18. The return spring 24 exerts a biasing force against the piston 18 in a direction away from the motor rotor hub 14 (i.e. biases the piston 18 to an unengaged position). A retainer ring 26 is disposed in a groove 28 formed in the inner surface 22 of the transmission case 12. The retainer ring contacts an inner diameter of the return spring 24, thereby acting as a counterforce to the bias of the return spring 24.

The torque transmitting device 10 further includes an apply plate 30 that is actuatable by the piston 24 to engage a clutch pack 32. The apply plate 30 has first and second opposing sides 31 and 33, respectively. The apply plate 30 also includes an annular body 34 having a plurality of tabs 36 extending from an inner diameter 37 of the annular body 34. The annular body 34 is positioned radially outwardly from the piston 18, the return spring 24, and the motor rotor hub 14. In addition, the annular body 34, when in an unengaged position, is approximately in radial alignment with the return spring 24. The annular body 34 includes an end portion 42 having a distal end surface 43. The end portion 42 includes an apply surface 44 located on the second side 33 that is operable to contact the clutch pack 32 when the apply plate 30 is actuated. The annular body 34 has a curved cross-sectional area creating a pocket 43 along the second side 33 radially inward of the apply surface 44.

The tabs 36 extend radially inward from the body portion 34 towards the piston 18. The tabs 36 include a radial straight portion 46 that is connected with the annular body 34 and extends radially inwardly towards the piston 18. A curved portion 48 is connected with the end of the radial straight portion 46 and terminates in an end portion 50 that includes a distal end surface 51. The curved portion 48 includes a contact surface 52 located on the first side 31 that is in contact with the piston 18. The free end portion 50 is captured within the piston 18. The end portion 42 of the annular body 34 and the end portion 50 of the tabs 36 are substantially radially aligned. It should be appreciated that the apply plate 30 may have any number of tabs 36 without departing from the scope of the present invention.

The clutch pack 32 is disposed radially outwardly from the piston 18 and the motor rotor hub 14. The clutch pack 32 includes an apply disc 52, a backing disc 54, and a friction plate 56. The apply disc 52 includes a first end 58 having a plurality of splines 60 disposed within axially extending grooves 62 formed in the inner surface 22 of the transmission case 12. Accordingly, the apply disc 52 is rotationally fixed to the transmission case 12 but slidable in the axial direction relative to the transmission case 12.

The backing disc 54 includes a first end 64 having a plurality of splines 66 disposed within the axially extending grooves 62 of the transmission case 12. Accordingly, the backing disc 54 is rotationally fixed to the transmission case 12. The backing disc 54 is prevented from axial translation relative to the housing 12 by a retaining ring 68 disposed within a groove 70 formed in the inner surface 22 of the transmission case 12.

The friction plate 56 is partially disposed between the apply plate 52 and the backing plate 54. The friction plate 56 includes first and second opposing sides 72 and 74, respectively, as well as a straight radial portion 76 connected with an axial portion 78. The straight radial portion 76 is disposed between the apply disc 52 and the backing disc 54 and terminates in an end portion 80 that includes a distal end surface 81. The straight radial portion 76 includes friction elements 82 located on the first and second sides 72 and 74. The axial portion 78 extends axially underneath the backing disc 54 towards the motor rotor hub 14 and terminates in an end portion 84. A plurality of splines 86 extend radially inwardly from the end portion 84 and are disposed within grooves 88 formed along an outer diameter 90 of the motor rotor hub 14. Accordingly, the friction plate 56 is rotationally coupled to the motor rotor hub 14.

The torque transmitting device 10 is axially compact due to radial stacking of components. For example, the apply disc 52 is in radial alignment with the straight portion 46 of the apply plate 30 when the apply plate 30 is in the unengaged position and the clutch pack 32 is disposed at least partially radially outward from the piston 18 and motor rotor hub 14. The apply disc 52, the backing disc 54, and the friction plate 56 are disposed entirely radially outward of the piston 18. In addition, the backing disc 54, the axial portion 78 of the friction plate 56, and the motor rotor hub 14 are radially aligned. This radial stacking of components is accomplished by the radial offset of the apply plate 24, the apply disc 52 and backing disc 54, and the friction plate 56 from the rotor motor hub 14 and the piston 18.

To engage the torque transmitting device 10, the piston 18 is actuated by a flow of pressurized hydraulic fluid on an apply side 92 of the piston 18. The piston 18 translates against the biasing force of the return spring 24 and engages the contact surface 52 of the apply plate 30. The apply plate 30 in turn translates in an axial direction towards the motor rotor hub 14. The contact surface 44 of the apply plate 30 contacts the apply disc 52 and translates the apply disc 52 towards the friction plate 56. The friction plate 56 is then compressed between the apply plate 52 and the backing plate 54, thereby coupling the motor rotor hub 14 to the transmission case 12 and braking the motor rotor hub 14. To disengage the torque transmitting device 10, the apply side 92 of the piston 18 is depressurized, and the return spring 24 moves the apply plate 30 and piston 18 back to the unengaged positions, thereby de-coupling the motor rotor hub 14 from the transmission case 12.

The description of the invention is merely exemplary in nature and variations that do not depart from the gist of the invention are intended to be within the scope of the invention. Such variations are not to be regarded as a departure from the spirit and scope of the invention.

What is claimed is:

1. A torque transmitting device for selectively transmitting torque between a first member and a second member, the torque transmitting device comprising:
    an annular piston that defines an axis;
    an apply plate translatable along the axis between an unengaged position and an engaged position, the apply plate having a first end and a second end, wherein the first end is disposed radially inward of the second end and the first end is disposed in radial alignment with the second end, and wherein the first end is in contact with the piston;
    an apply disc rotationally coupled to the first member, wherein the apply disc is translatable between an unengaged position and an engaged position along the axis, and wherein the apply disc is disposed radially outward of the piston;
    a backing disc rotationally and axially fixed to the first member and disposed radially outward of the piston; and
    a friction plate disposed between the apply disc and the backing disc, the friction plate having a first end and a second end, wherein the first end is disposed radially inward of the second end, wherein the first end is rotationally coupled to the second member, and wherein the friction plate is disposed radially outward of the piston,
    wherein the torque transmitting device is engaged when the piston is pressurized and translates the apply plate, the second end of the apply plate contacts the apply disc, and the friction plate is compressed between the apply disc and the backing disc, thereby rotationally coupling the apply disc and backing disc with the friction plate.

2. The torque transmitting device of claim 1 wherein the apply plate includes at least one tab, wherein the first end is located on the at least one tab.

3. The torque transmitting device of claim 2 wherein the apply plate includes an annular portion, wherein the second end is located on the annular portion and wherein the at least one tab extends radially inwardly from an inner diameter of the annular portion.

4. The torque transmitting device of claim 3 wherein the inner diameter of the annular portion is axially offset from the first and second ends.

5. The torque transmitting device of claim 4 wherein a portion of the apply plate is in radial alignment with at least one of the apply disc and the friction plate.

6. The torque transmitting mechanism of claim 1 wherein the apply disc, the backing disc, and the friction plate are disposed entirely radially outward of the annular piston.

7. The torque transmitting mechanism of claim 1 wherein the apply plate, apply disc, backing disc, and friction plate are coaxial with the annular piston.

8. The torque transmitting mechanism of claim 1 wherein the friction plate includes a radial portion disposed between the apply disc and the backing disc and an axial portion disposed radially inward of the backing disc and in radial alignment with the backing disc, wherein the second end of the friction plate is disposed on the radial portion.

9. The torque transmitting mechanism of claim 8 wherein the friction plate includes at least one spline disposed radially inward from an end of the axial portion, wherein the spline is engaged with the second member.

10. The torque transmitting mechanism of claim 9 wherein the friction plate includes first and second friction surfaces on opposite sides of the radial portion of the friction plate.

11. The torque transmitting mechanism of claim 1 further comprising a return spring in engagement with the first member and with the piston, wherein the return spring moves the piston and apply plate to the unengaged position when the piston is depressurized.

12. A torque transmitting device for selectively transmitting torque between a first member and a second member, the torque transmitting device comprising:
    an annular piston that defines an axis;
    an apply plate coaxial with the annular piston and translatable along the axis between an unengaged position and an engaged position, the apply plate having a first end and a second end, wherein the first end is disposed radially inward of the second end, the first end is disposed in radial alignment with the second end, and wherein the first end is in contact with the piston;
    an apply disc coaxial with the piston and rotationally coupled to the first member, wherein the apply disc is translatable between an unengaged position and an engaged position along the axis, and wherein the apply disc is disposed entirely radially outward of the piston;
    a backing disc coaxial with the piston and rotationally and axially fixed to the first member, wherein the backing disc is disposed entirely radially outward of the piston; and
    a friction plate coaxial with the piston and disposed between the apply disc and the backing disc, the friction plate having a first end and a second end, wherein the first end is disposed radially inward of the second end, wherein the first end is rotationally coupled to the second member, and wherein the friction plate is disposed entirely radially outward of the piston,
    wherein the torque transmitting device is engaged when the piston translates the apply plate along the axis, the second end of the apply plate contacts the apply disc, and the friction plate is compressed between the apply disc and the backing disc, thereby rotationally coupling the apply disc and backing disc with the friction plate.

13. The torque transmitting device of claim 12 wherein the apply plate includes a plurality of tabs and the first end is located on a first side of each of the plurality of tabs.

14. The torque transmitting device of claim 13 wherein the apply plate includes an annular portion, wherein the second end is located on a second side of the annular portion opposite the first side of the plurality of tabs, and wherein the plurality of tabs extend radially inwardly from an inner diameter of the annular portion.

15. The torque transmitting device of claim 14 wherein the distal end surfaces of the plurality of tab members are in radial alignment with a distal end surface of the annular portion of the apply plate, and wherein the inner diameter of the annular portion is axially offset from the first and second ends.

16. The torque transmitting device of claim 15 wherein a portion of the apply plate is in radial alignment with at least one of the apply disc and the friction plate.

17. The torque transmitting mechanism of claim 12 wherein the friction plate includes a radial portion disposed between the apply disc and the backing disc and an axial portion disposed radially inward of the backing disc and in radial alignment with the backing disc, wherein the second end of the friction plate is disposed on the radial portion.

18. The torque transmitting mechanism of claim 17 wherein the friction plate includes at least one spline disposed radially inward from an end of the axial portion, wherein the first end of the friction plate is located on the at least one spline.

19. The torque transmitting mechanism of claim 18 wherein the friction plate includes first and second friction surfaces on opposite sides of the radial portion of the friction plate.

20. The torque transmitting mechanism of claim 12 further comprising a return spring in engagement with the first member and with the piston, wherein the return spring moves the piston and apply plate to the unengaged position.

21. An assembly comprising:
    a first member;
    a second member that defines an axis; and
    a torque transmitting device for selectively transmitting torque between the first member and the second member, the torque transmitting device coaxial with the second member and comprising:
        an annular piston;
        an apply plate translatable along the axis between an unengaged position and an engaged position, the apply plate having a first end and a second end, wherein the first end is disposed radially inward of the second end, the first end is disposed in radial alignment with the second end, and wherein the first end is in contact with the piston;
        an apply disc rotationally coupled to the first member, wherein the apply disc is translatable between an unengaged position and an engaged position along the axis, and wherein the apply disc is disposed entirely radially outward of the piston;
        a backing disc rotationally and axially fixed to the first member, wherein the backing disc is disposed entirely radially outward of the piston; and
        a friction plate disposed between the apply disc and the backing disc, the friction plate having a first end and a second end, wherein the first end is disposed radially inward of the second end, wherein the first end is rotationally coupled to the second member, and wherein the friction plate is disposed entirely radially outward of the piston,
    wherein the torque transmitting device is engaged when the piston translates the apply plate along the axis, the second end of the apply plate contacts the apply disc, and the friction plate is compressed between the apply disc and the backing disc, thereby rotationally coupling the apply disc and backing disc with the friction plate, and
    wherein a portion of the second member is disposed radially inward of and in radial alignment with a portion of the friction plate and the backing disc.

22. The assembly of claim 21 wherein the first member is a transmission housing and the second member is a motor rotor hub of an electric motor.

* * * * *